(12) United States Patent
Li et al.

(10) Patent No.: US 9,697,465 B2
(45) Date of Patent: Jul. 4, 2017

(54) DRAWING AN INFERENCE OF A USAGE CONTEXT OF A COMPUTING DEVICE USING MULTIPLE SENSORS

(71) Applicant: MOTOROLA MOBILITY LLC, Chicago, IL (US)

(72) Inventors: Jianguo Li, Chicago, IL (US); Paul C. Davis, Arlington Heights, IL (US); James A. Rumpler, Chicago, IL (US); Di You, Palatine, IL (US)

(73) Assignee: Google Technology Holdings LLC, Mountain View ( * ) Notice: Subject to any disclaimer, the term of this patent is extended or adjusted under 35 U.S.C. 154(b) by 387 days.

(21) Appl. No.: 14/338,622

(22) Filed: Jul. 23, 2014

(65) Prior Publication Data

US 2015/0317565 A1  Nov. 5, 2015

Related U.S. Application Data

(60) Provisional application No. 61/986,158, filed on Apr. 30, 2014.

(51) Int. Cl.
*G06F 9/44* (2006.01)
*G06N 7/02* (2006.01)
*G06N 5/02* (2006.01)
*G06N 5/04* (2006.01)

(52) U.S. Cl.
CPC ............... *G06N 5/02* (2013.01); *G06N 5/043* (2013.01); *G06N 5/048* (2013.01)

(58) Field of Classification Search
None
See application file for complete search history.

(56) References Cited

U.S. PATENT DOCUMENTS

| | | | |
|---|---|---|---|
| 2003/0083756 A1* | 5/2003 | Hsiung | G05B 15/02 700/28 |
| 2009/0219209 A1 | 9/2009 | Bush et al. | |
| 2010/0255856 A1 | 10/2010 | Kansal et al. | |
| 2012/0083901 A1* | 4/2012 | Langlois | A61F 2/64 623/24 |
| 2014/0247206 A1* | 9/2014 | Grokop | G06F 1/3287 345/156 |

FOREIGN PATENT DOCUMENTS

WO    2012061595 A1    5/2012

OTHER PUBLICATIONS

Mobilizelabs, Mobility Classification System, http://mobilizelabs.org/mobility-classification-system-0, downloaded from internet: Apr. 7, 2014, all pages.

* cited by examiner

*Primary Examiner* — Li-Wu Chang
(74) *Attorney, Agent, or Firm* — Shumaker & Sieffert, P.A.

(57) ABSTRACT

Disclosed are techniques (300, 500, 600) and apparatuses (102, 700) for drawing an inference using multiple sensors. These techniques and apparatuses enable a computing device to choose (302) a set of sensors that are capable of providing information for an inference, invoke (304) the chosen set of sensors to provide the information, receive (306) the information from at least a subset of the chosen sensors, and draw (308), based on the received information, the inference. In some cases, the set of sensors are chosen such that time or resources of the computing device can be conserved.

15 Claims, 7 Drawing Sheets

DRAWING AN INFERENCE OF A USAGE CONTEXT OF A COMPUTING DEVICE USING MULTIPLE SENSORS

CROSS-REFERENCE TO RELATED APPLICATIONS

The present application claims priority to U.S. Provisional Patent Application 61/986,158 filed Apr. 30, 2014, which is incorporated herein by reference in its entirety.

TECHNICAL FIELD

The present disclosure is related generally to personal computing devices and, more particularly, to determining aspects of the device's status or environment.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Electronic devices such as smartphones, tablets, and so on are increasingly capable of customizing their behavior to accommodate particular environments or contexts, such as their user's location, activity, and emotion. For example, a device that is being used while in a moving vehicle ideally should behave differently from a device that is being used in a stationary location. Such devices, however, seldom have direct knowledge of their usage environment or context, which can render behavior customization of an electronic device a difficult, inconvenient (e.g., requiring user involvement), or complex process.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Conventional techniques for determining a context or environment of a device typically rely on receiving information from one or two sensors of the device. In some cases, information provided by the second sensor may not be considered depending on a determination made based on information provided by the first sensor. Additionally, selection and order of sensor usage often ignores costs associated with running each sensor of the device. For example, time- and resource-intensive sensors (e.g., a global positioning system ("GPS") module) may be selected in lieu of other lower-power or more time-efficient sensors. Thus, conventional techniques often waste valuable time and system resources when attempting to determine the context of the device.

This disclosure describes techniques and apparatuses for drawing an inference using multiple sensors, which may enable a computing device to efficiently determine a usage context of the computing device. Multiple sensors of the computing device can be run either sequentially or in parallel. In the sequential running of sensors, information received from an earlier run sensor is relied on if a confidence level of the sensor is high, otherwise other sensors are permitted to run to increase the cumulative confidence level. When running sensors in parallel, results from one sensor may have a confidence level such that other sensors may be cancelled, enabling the conservation of time and system resources. Additionally, costs associated with each sensor can be used to determine which, or how often, sensors of the computing device are run. By so doing, inferences about the usage context of the computing device can be drawn in a time-efficient and cost-effective manner.

The following discussion first describes an operating environment, followed by techniques that may be employed in this environment, and ends with example apparatuses.

Figure 1:
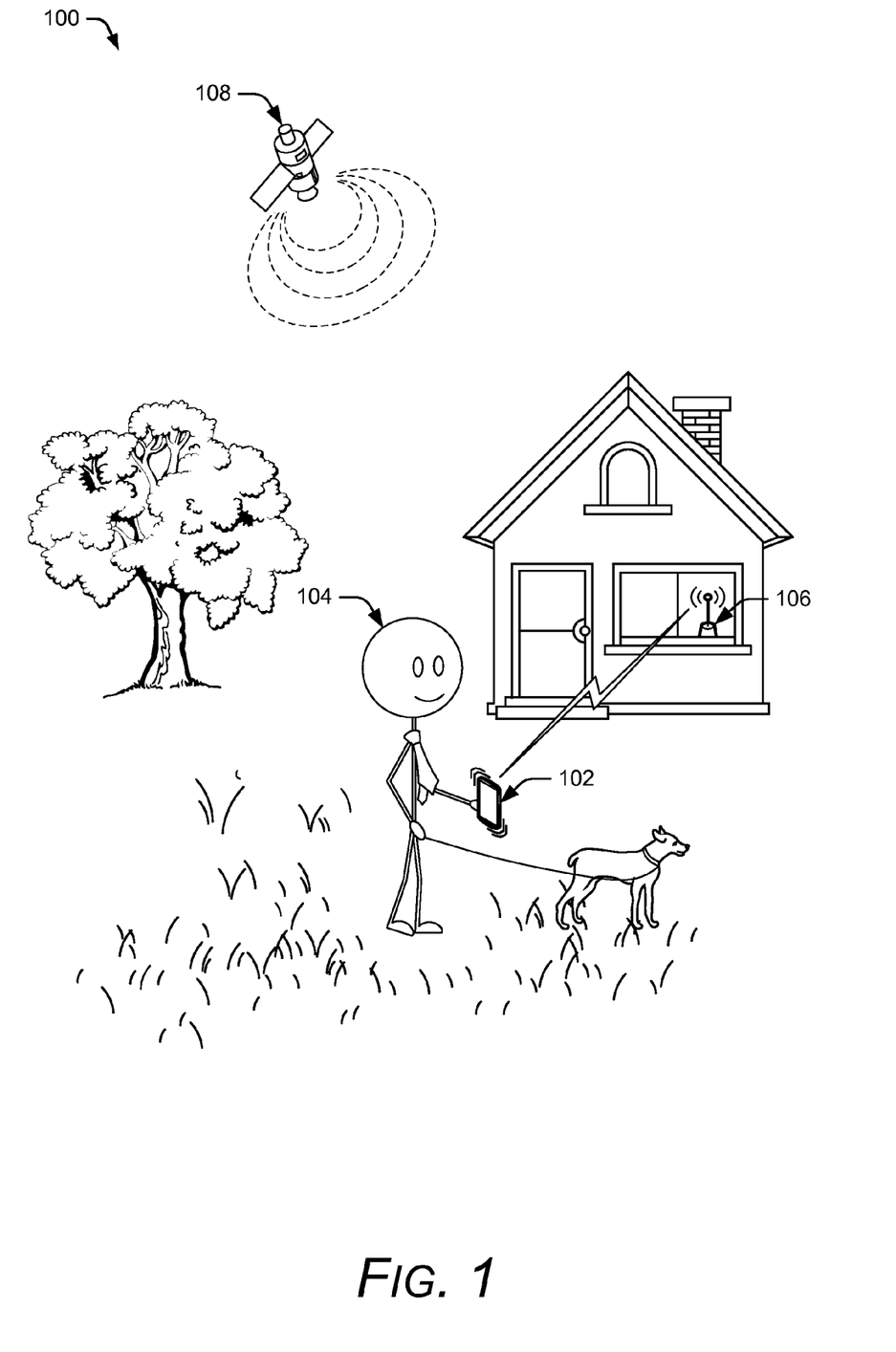
FIG. 1 illustrates an example environment in which techniques using multiple sensors to draw an inference can be implemented.

Operating Environment: FIG. 1 illustrates an example environment 100 in which techniques described herein can be implemented. Environment 100 includes a computing device 102 having sensors (not shown) that enable computing device 102 to sense various properties, stimuli, or characteristics of the environment 100 in which computing device 102 operates. In this particular example, the sensors can provide computing device 102 with information about several aspects of environment 100. For example, an accelerometer is capable of providing information that describes movement of computing device 102 as user 104 walks through environment 100.

The sensors of computing device 102 may also communicate with different entities of environment 100, such as wireless local-area-network ("WLAN") access point 106 or GPS satellite 108. In some cases, information provided by a WLAN interface of computing device 102 that describes changes in WLAN associations or signal strength can be used to determine a speed of computing device 102. Alternately or additionally, a GPS module of computing device 102 can use signals received from GPS satellite 108 and from other GPS satellites to provide a location, speed, or heading of computing device 102. These are but a few examples of information that sensors of computing device 102 are capable of providing.

From the information provided by the sensors, computing device 102 can make inferences or predictions about a usage context in which computing device 102 is operating. Example usage contexts of computing device 102 may include a user's emotion, location, or activity state. Various activity states for a user may include being stationary, walking, running, driving a car, riding a bicycle, riding in a car or train, and the like. By inferring or predicting a usage context of computing device 102, behavior or features of the device 102 can be customized to accommodate each of the different usage contexts. For example, texting and other distracting features of computing device 102 can be disabled when an inference indicates user 104 is driving a car, riding a bicycle, or performing another attention-centric activity. In other cases, audible features of computing device 102 can be disabled, such as ringtones and audible alerts, when an inference indicates user 104 is sleeping or watching a movie at a theater. How computing device 102 is implemented to draw inferences using multiple sensors may vary and is described below.

Figure 2:
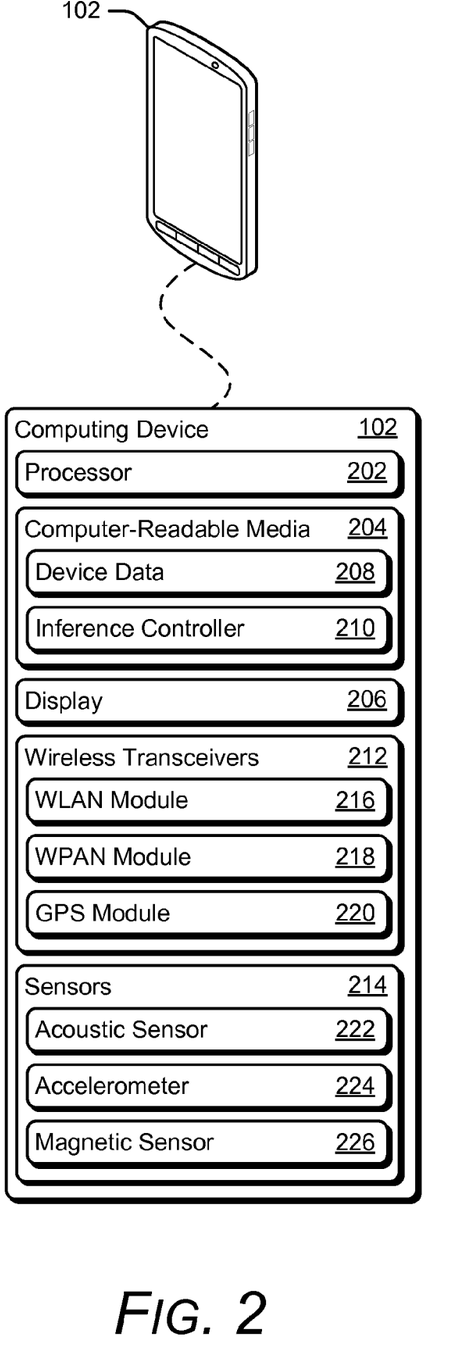
FIG. 2 illustrates an example computing device capable of drawing an inference using multiple sensors.

More specifically, consider FIG. 2, which illustrates an example embodiment of computing device 102 of FIG. 1. Computing device 102 can be, or include, many different types of computing or electronic devices capable of drawing an inference using multiple sensors. In this example, computing device 102 is shown as a smartphone, though other devices are contemplated. Other computing devices 102 may include, by way of example only, a cellular phone, notebook computer (e.g., netbook or ultrabook), camera (compact or single-lens reflex), smart-watch, smart-glasses, tablet computer, personal media player, personal navigating device (e.g., global positioning system), gaming console, desktop computer, video camera, or portable gaming device.

Computing device 102 includes processor 202, which may be configured as a single or multi-core processor capable of enabling various functionalities of computing device 102. In some cases, processor 202 includes a digital-signal processing subsystem for processing various signals or data of computing device 102. Processor 202 may be coupled with, and may implement functionalities of, any other components or modules of computing device 102 that are described herein.

Computing device 102 includes computer-readable media 204 ("CRM") and display 206. Computer-readable media 204 include device data 208, such as an operating system, firmware, or applications of computing device 102 that are executable by processor 202. Device data 208 may also include various user data, such as images, music, documents, emails, contacts, and the like. CRM 204 also include inference controller 210, which in this example is embodied as computer-executable code stored on CRM 204.

Inference controller 210 can infer or predict a usage context of computing device 102. For example, inference controller 210 can draw an inference based on information received from multiple sources, such as sensors or wireless transceivers of computing device 102. In some cases, inference controller 210 chooses and invokes the sources from which the information is received. The choosing of the sources can be performed based on costs associated with each source, such that resources of computing device 102 are conserved or maximized. Further implementations and uses of inference controller 210 vary and are described below in greater detail.

Display 206 presents imagery or content for viewing by a user. Display 206 may be integrated with, or separate from, computing device 102. In some cases, the user can interact with content-related applications or graphical user-interfaces of computing device 102 through display 206. In such cases, the display may be associated with, or include, a touch-sensitive input device (e.g., touch-screen) through which user input is received.

Computing device 102 also includes wireless transceivers 212 and sensors 214, both of which are capable of providing information useful to draw inferences about a usage context of computing device 102. Using information from multiple sources, such as wireless transceivers 212 and sensors 214, typically leads to a more accurate inference or prediction than one based on individual information sources used alone. Whereas some sources of information are power efficient, others demand more time, power, or other system resources to run. As such, inference controller 210 may combine results from various sources in such a way that accurate and reliable inferences can be achieved while still keeping time and resource consumption tolerable. Example sources and constraints associated therewith, such as cost, efficiency, and even privacy, are described below in greater detail.

Wireless transceivers 212 enable computing device 102 to communicate data via various networks, such as navigational networks, infrastructure-oriented networks, or peer-to-peer networks. In this particular example, wireless transceivers 212 include WLAN module 216, wireless personal-area network ("WPAN") module 218 (e.g., Bluetooth™), and GPS module 220. Other types of wireless transceivers contemplated include near-field communication modules and cellular radios.

In some embodiments, wireless transceivers 212 provide information that enables inference controller 210 to infer a particular use, movement, or a location of computing device 102. For example, changes in network and signal information of WLAN module 216 may indicate that computing device 102 is moving. Alternately, static network and signal information may indicate that computing device 102 is stationary in a known (e.g., in a familiar network or with peers) or unknown location.

Similar network and signal information may also be provided by WPAN module 218, which may associate with other WPAN networks and peer devices. Additionally, WPAN module 218 may provide information associated with vehicle movement with a high degree of confidence. By communicating with vehicle-specific devices, such as a vehicle entertainment system or hands-free audio ear piece, information provided by WPAN module 218 may accurately and quickly indicate the computing device's presence in a moving vehicle.

GPS module 220 provides navigational information that may include a heading, velocity, elevation, or location of computing device 102. This information is often highly accurate and enables inference controller 210 to determine whether computing device 102 is stationary or moving in a particular direction or at a particular speed. Even with limited satellite reception, GPS module 220 may provide partial navigational information using dead-reckoning navigation that relies on a previous heading, precise timing, maps, or sensors 214. Because wireless transceivers 212 are capable of determining a location of computing device 102 or transmitting identifiable data to other entities, there may be privacy concerns or costs associated with wireless transceivers 212 providing information for inferences.

Sensors 214 enable computing device 102 to sense various properties, variances, or characteristics of a context in which computing device 102 operates. Although shown integrated with computing device 102, some sensors 214 may be implemented remotely from computing device 102 and communicate data via wireless transceivers 212. Here, sensors 214 include acoustic sensor 222, accelerometer 224, and magnetic sensor 226. Other types of sensors contemplated include an infrared sensor, proximity sensor, light sensor, magnetic sensor, temperature/thermal sensor, microelectromechanical systems, camera sensor (e.g., charge-coupled device sensor or complementary-metal-oxide semiconductor sensor), capacitive sensor, and so on.

Acoustic sensor 222 includes microphones or acoustic-wave sensors that provide information describing acoustic characteristics of an environment. For example, the information provided by acoustic sensor 222 may include frequencies or tones associated with a running vehicle, train, or airplane. Accelerometer 224 can sense movement or an orientation of computing device 102 in any suitable aspect, such as in one-dimension, two-dimensions, three-dimensions, multi-axis combinations, and the like. Acoustic sensor 222 and accelerometer 224 are often implemented as low-power sensors that consume very few resources of computing device 102. Because of this, these sensors may be invoked more often to provide information useful to make inferences.

In general, sensors that consume more resources to operate tend to generate more accurate and reliable inferences or predictions. Therefore, when resources, such as power, are not an issue, sensors that consume more resources (e.g., a GPS module) can be run more frequently. By way of example, if inference controller 210 detects that a querying device has sufficient resources, then a GPS module can be run more frequently than usual to obtain more accurate predictions. On the other hand, if inference controller 210 detects that the querying device is low in power or other resources, then GPS should be run only when more accurate or reliable inferences or predictions are necessary.

Magnetic sensor 226 may include a Hall-effect sensor, magneto-diode, magneto-transistor, or magnetometer configured to sense magnetic-field characteristics around computing device 102. Magnetic sensor 226 may sense a change in magnetic-field strength, magnetic-field direction, magnetic-field orientation, or any combination thereof. In some embodiments, proximity with a user or another device can be inferred or determined based on information provided by magnetic sensor 226. Generally, sensors 214 are often incapable of providing an exact location of computing device 102 or of transmitting identifiable data to other entities and therefore may be less costly to run from the perspective of privacy.

Example Techniques: The following discussion describes techniques that enable drawing an inference from multiple sensors. These techniques can be implemented utilizing the previously described entities, such as inference controller 210, wireless transceivers 212, or sensors 214 of FIG. 2. These techniques include example methods illustrated in FIGS. 3, 5, and 6, which are shown as operations performed by one or more entities. The orders in which operations of these methods are shown or described are not intended to be construed as a limitation, and any number or combination of the described method operations can be combined in any order to implement a method, or an alternate method, including any of those illustrated by FIGS. 3, 5, and 6.

Figure 3:
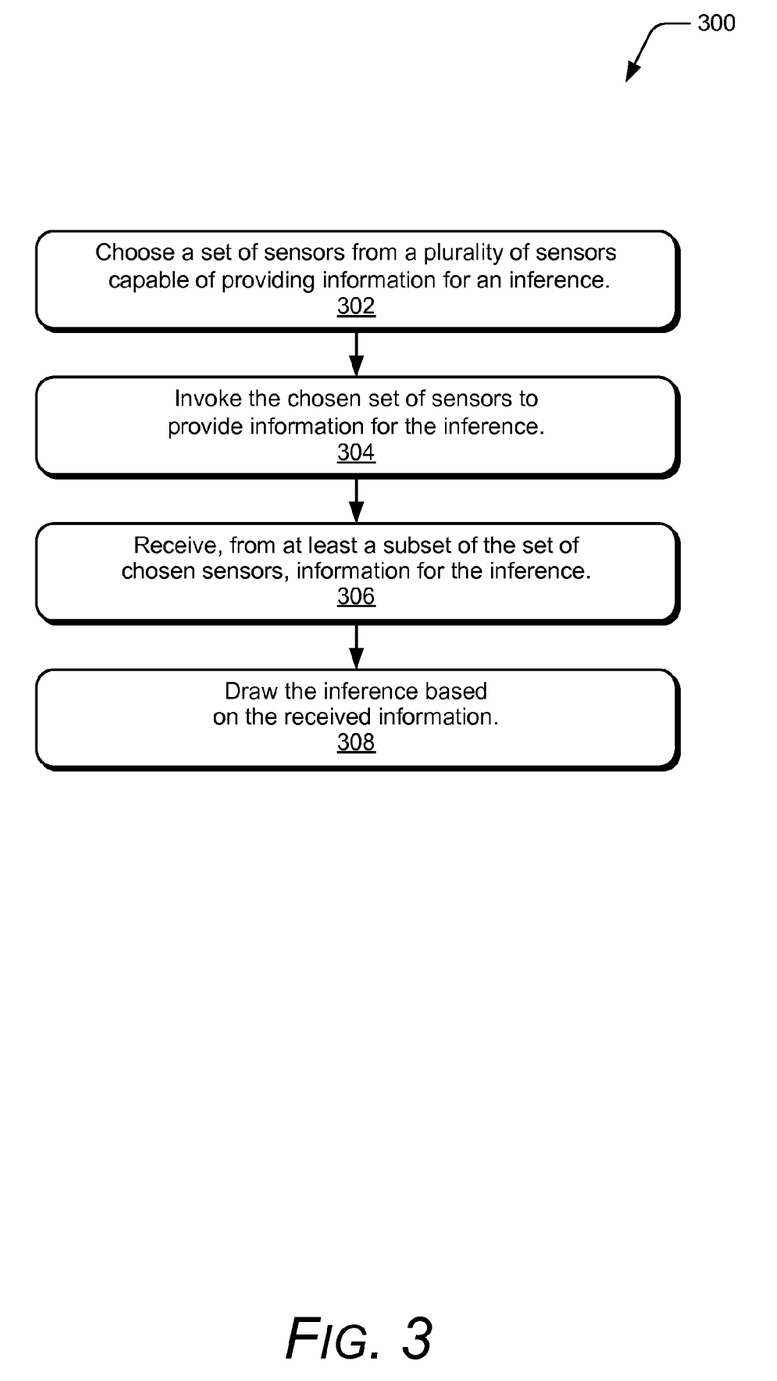
FIG. 3 illustrates an example method of drawing an inference using multiple sensors.

FIG. 3 illustrates example method 300 of drawing an inference using multiple sensors.

At 302, a set of sensors are chosen from a plurality of sensors that are capable of providing information for an inference. The chosen set of sensors may include a single sensor of the plurality of sensors or every sensor in the plurality of sensors. In some cases, choosing the set of sensors includes choosing which sensors to run and how often to run each of the chosen sensors. For example, sensors that consume less resources can be run more often than sensors that consume substantial amounts of resources. The set of chosen sensors can be invoked sequentially or in parallel. In sequential running, a sensor typically starts running after the previous sensor has reported its information. In parallel running, all of the chosen sensors start running at the same time. As a result, sequential running may potentially take longer, while parallel running may potentially consume more resources.

The set of sensors can be chosen based on any suitable sensor-related criteria, such as how many resources will a sensor consume to provide information, how accurate or reliable is the sensor's information, how long does it take the sensor to provide its information, how often can the sensor provide information or update information, or what is the cost of running the sensor (e.g., privacy concerns). Other criteria for choosing the set of sensors may include an expected margin of error for information to be provided by a sensor, an expected degree of confidence for information to be provided by a sensor, an expected overlap of information to be provided by a set of the sensors, an expected price for using a sensor, an importance of the inference to be drawn, or an acceptability threshold for information for the inference. The performance of each individual sensor with respect to any of these criteria can be experimentally or empirically estimated and determined.

In some embodiments, availability of system resources of a device may be considered when choosing the set of sensors. These resources may include available current, power, processing cycles, memory, data-bus access, network connectivity, and the like. When system resources are limited, resource-efficient sensors can be run more frequently than sensors that consume more resources. In the case of vehicle-mode detection, acoustic sensors consume far fewer resources (e.g., current, power) than does a GPS module, which can enable acoustic-based inferences and classification to be run far more frequently than GPS-based inferences. Further, if prediction speed outweighs considerations of efficiency or resource consumption, then parallel running may be preferred. Alternately, sequential running may be more desirable if resource efficiency and resource consumption are more important.

Figure 4:
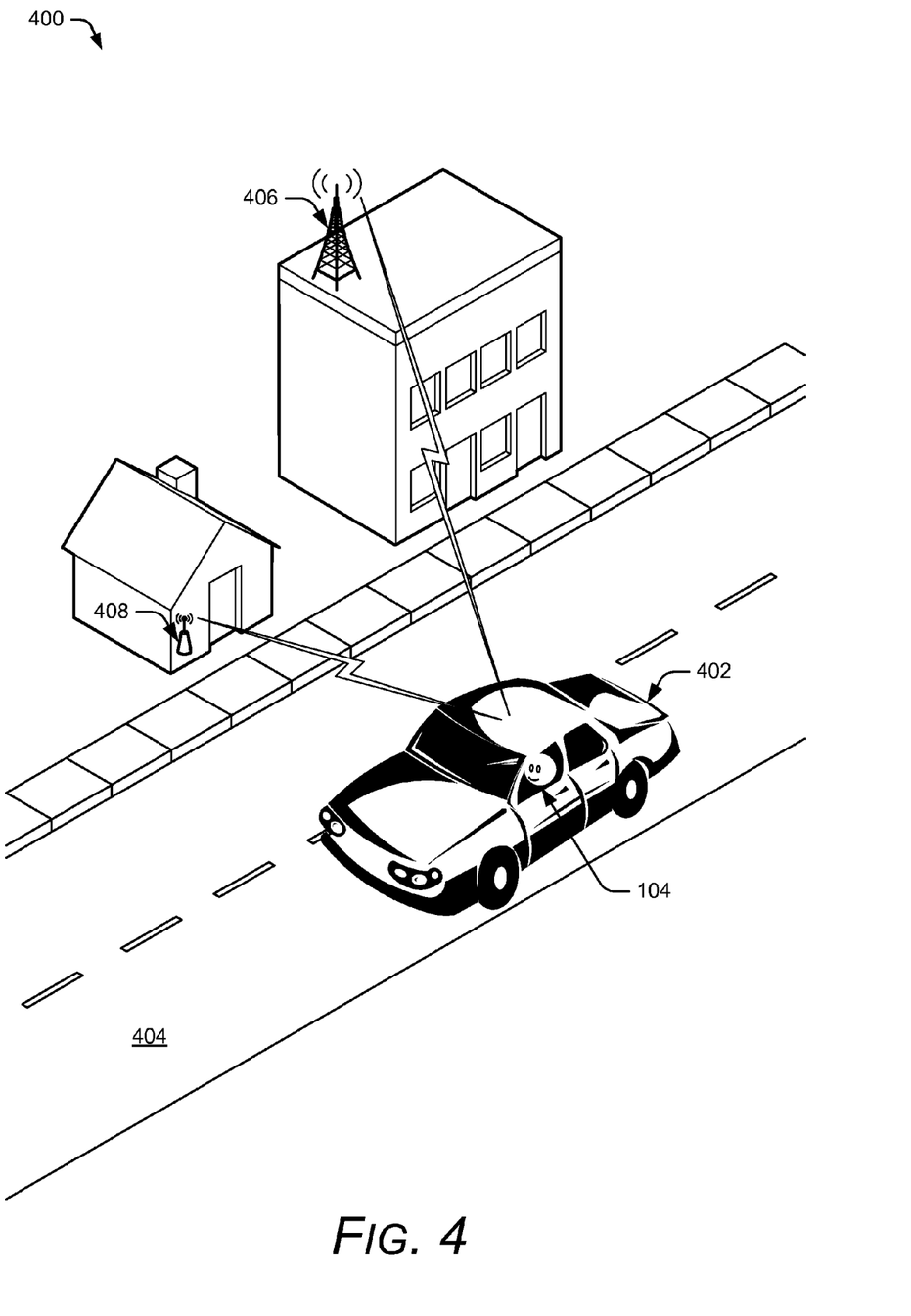
FIG. 4 illustrates another example environment in which techniques using multiple sensors to draw an inference can be implemented.

By way of example, consider example environment 400 of FIG. 4, in which user 104 is driving car 402 along road 404. Assume here that user 104 attempts to open a text-messaging application of computing device 102, which is implemented as a smartphone (not shown, inside car 402) in this example, in order to send a text message to one of his friends. Before enabling the text-messaging application, a modality of the smartphone configures the smartphone's features and behavior for the environment in which it is operating. To do so, inference controller 210 selects a set of the smartphone's sensors by which to infer a modality of the smartphone. Here, inference controller 210 selects acoustic sensor 222, accelerometer 224, and WLAN module 216.

At 304, the chosen set of sensors are invoked to provide information for the inference. Invoking the chosen set of sensors may invoke a single one of the chosen sensors, some of the chosen sensors, or all of the chosen sensors. In some cases, invoking a single one of the chosen sensors may reduce consumption of device resources, which may be important when resources are limited or use thereof is constrained. Alternately, invoking some or all of the chosen sensors in parallel may provide the information for the inference more quickly.

In the context of the present example, assume that the smartphone of user 104 is plugged into a charging port of car 402. Here, inference controller 210 invokes acoustic sensor 222, accelerometer 224, and WLAN module 216 in parallel because resource consumption, such as current and power of the smartphone, is not of concern. In response to being invoked, each sensor begins running to collect data that can be used by inference controller 210 to draw the inference about the smartphone's usage context. These data include acoustic data collected by acoustic sensor 222, acceleration information from accelerometer 224, and network information from WLAN module 216, which receives network beacons from WLAN access points 406 and 408.

At 306, information from at least a subset of the sensors is received. The subset of sensors may include a single one of the chosen sensors, some of the chosen sensors, or all of the chosen sensors. The information received from each of the chosen sensors may have in associated margin of error or degree of confidence. For example, information received from particular sensors, such as a GPS module, may have a small margin of error or high confidence level associated therewith. In some cases, the margin of error or degree of confidence of received information is useful to determine when an inference should be drawn. For example, when received information has a high confidence level, other sensors may be cancelled, and the inference can be drawn with a corresponding high level of confidence. Alternately, when received information has a low confidence level, other sensors may be allowed to run until a combined confidence-level threshold is met, at which point the inference can be drawn with an increased level of confidence.

Continuing the ongoing example, inference controller 210 first receives information from accelerometer 224 that indicates the smartphone 102 is not being carried by user 104. Because there are numerous modes and contexts that are applicable when the smartphone is not being carried, inference controller 210 permits acoustic sensor 222 and WLAN module 216 to continue running. Inference controller 210 then receives tone and frequency information from acoustic sensor 222 that indicates user 104 is likely in a running vehicle. Finally, inference controller 210 receives network information and signal-strength indicators that indicate contact with, and movement away from, WLAN access points 406 and 408.

At 308, the inference is drawn based on the received information. The inference drawn may include any suitable measurement, determination, Boolean value, prediction, geographical location, or activity determination. The inference drawn may also be, or be useful to determine, a usage context of a device, modality of a device, or environment in which a device is operating. In some cases, a behavior or features of a device are tailored in response to inferring the device's usage context, modality, or environment. For example, certain features of a device can be enabled or disabled for a particular usage context, such as when a user is driving, working, sleeping, and so on.

Concluding the present example, inference controller 210 infers, based on the information received from acoustic sensor 222 and WLAN module 216, that smartphone 102, and thus user 104, are travelling in a car. Based on this inference, the smartphone 102 is configured for a driving mode, which disables possibly distracting features of the smartphone 102, such as manual-entry features (e.g., text entry) of the messaging application. Accordingly, when user 104 attempts to access the messaging application, text-to-audio and voice-recognition features of the messaging application are enabled, which permit user 104 to hear text of messages and dictate outgoing messages while driving car 402.

Figure 5:
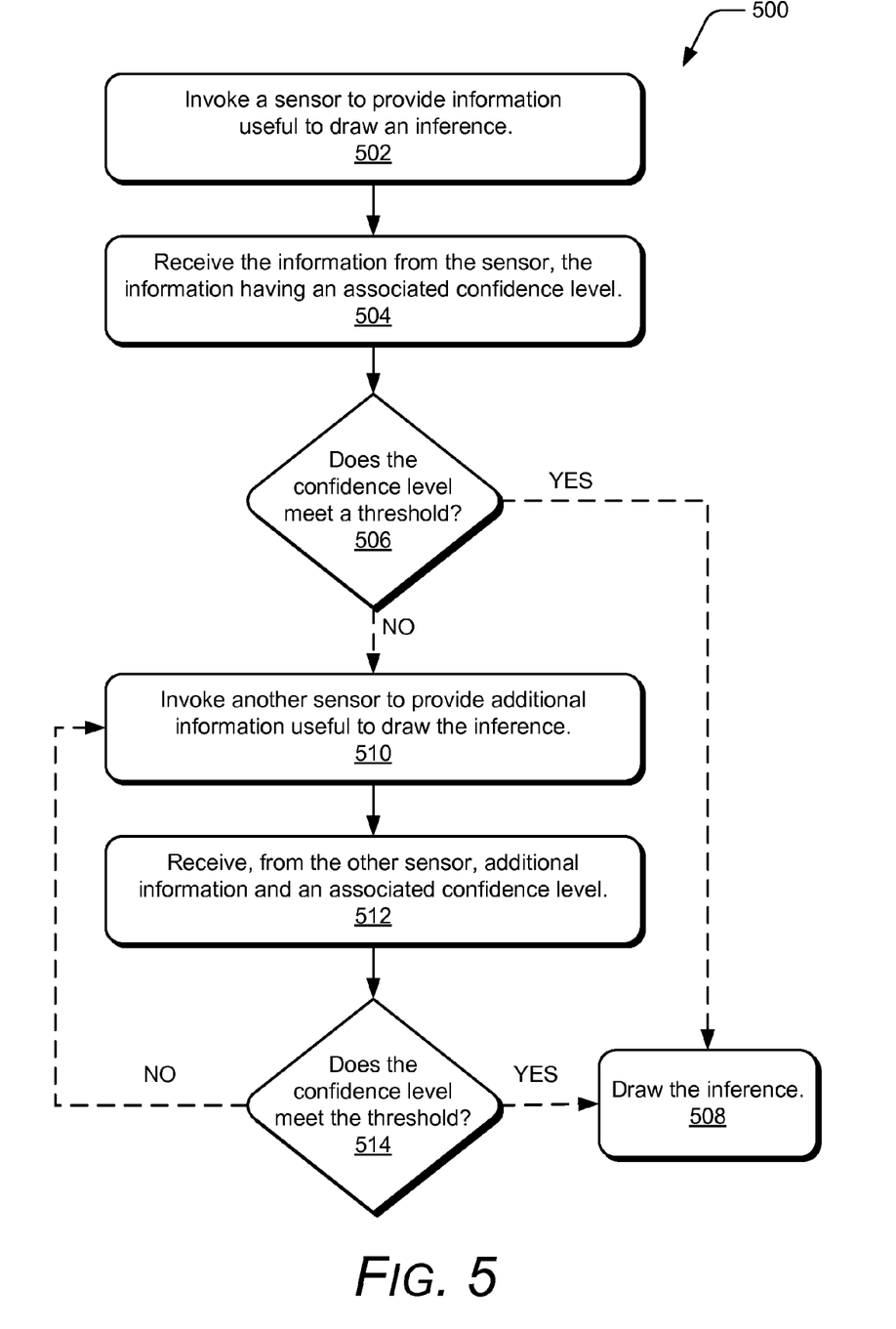
FIG. 5 illustrates a method of sequentially invoking sensors in accordance with one or more embodiments.

FIG. 5 illustrates methods 500 of sequentially invoking sensors in accordance with one or more embodiments.

At 502, a sensor is invoked to provide information useful to draw an inference. The invoked sensor may be a first of multiple sensors chosen to sequentially provide information for an inference. When sequentially invoking multiple sensors, the order in which the sensors are invoked and run can be important, such as when resources of a device are limited. Therefore, it may be preferable to first run a sensor that consumes less time or fewer resources to provide information.

At 504, the information is received from the sensor. The information has an associated confidence level, which may be determined, received from the sensor, or be previously-associated with the sensor. Although described as a confidence level, alternate statistical information and values may be implemented by the techniques described herein, such as a margin of error, degree of confidence, reliability, accuracy, precision, and the like.

At 506, the confidence level associated with the information is compared with a confidence-level threshold. The confidence level can be pre-defined or determined based on various factors, such as available time, device resources, or previous inferences. Determining the threshold may enable the threshold to be customized or tailored based on a device's environment or available resources. By drawing the inference when the confidence-level threshold is met, other sensors can be precluded from running, which can be effective to conserve device resources.

From operation 506, method 500 proceeds to operation 508 if the confidence level of the information meets or exceeds the confidence-level threshold. Alternately, method 500 proceeds to operation 510 if the confidence level of the information does not meet the confidence-level threshold. As noted above, by drawing the inference, method 500 may terminate without running remaining sensors of the multiple sensor chosen to run. In some cases, these remaining sensors may be time-consuming or resource intensive. For example, in vehicle-mode detection scenarios, inference by acoustic sensors consumes much less time and other resources than GPS-based inferences. For this reason, acoustic sensors can be invoked before other time-consuming or resource-intensive sensors.

Although acoustic inferences may be slightly less accurate than a GPS-based inference, the acoustic inferences can be trusted when the prediction is made with a high confidence level. Thus, if the confidence level is high enough (e.g., higher than a pre-defined threshold), then the prediction is trusted, thus avoiding the need to invoke the GPS sensor. If the confidence level of the acoustic sensor (or information) is low, however, then the GPS sensor can be invoked to receive additional information by which to draw the inference.

At 510, another sensor is invoked to provide additional information useful to draw the inference. As noted above, when sequentially invoking multiple sensors, the order in which the sensors are invoked and run can be important. Thus, a sensor that is second or third in the invocation order may consume more time or an increased amount of resources to provide the additional information. Sequentially invoking the multiple sensors can provide additional information for more accurate predictions without consuming too many resources.

At 512, the additional information is received from the other sensor. The additional information also has an associated confidence level, which may be determined, received from the other sensor, or previously associated with the other sensor. The additional information can be combined with previously received information, which may lead to more accurate inferences or predictions. The confidence level associated with the additional information may also be combined with the confidence level of the previously received information for threshold-comparison purposes.

At 514, the confidence level associated with the additional information is compared with a confidence-level threshold. In some cases, the combined confidence level of information received from multiple sensors is compared with the confidence-level threshold. Based on the results provided by operation 514, method 500 proceeds to operation 508 if the confidence level of the information meets or exceeds the confidence-level threshold. Alternately, method 500 returns to operation 510 if the confidence level of the information still does not meet the confidence-level threshold. By returning to operation 510, others of the multiple sensors can be invoked until information having a sufficient level of confidence is received.

Figure 6:
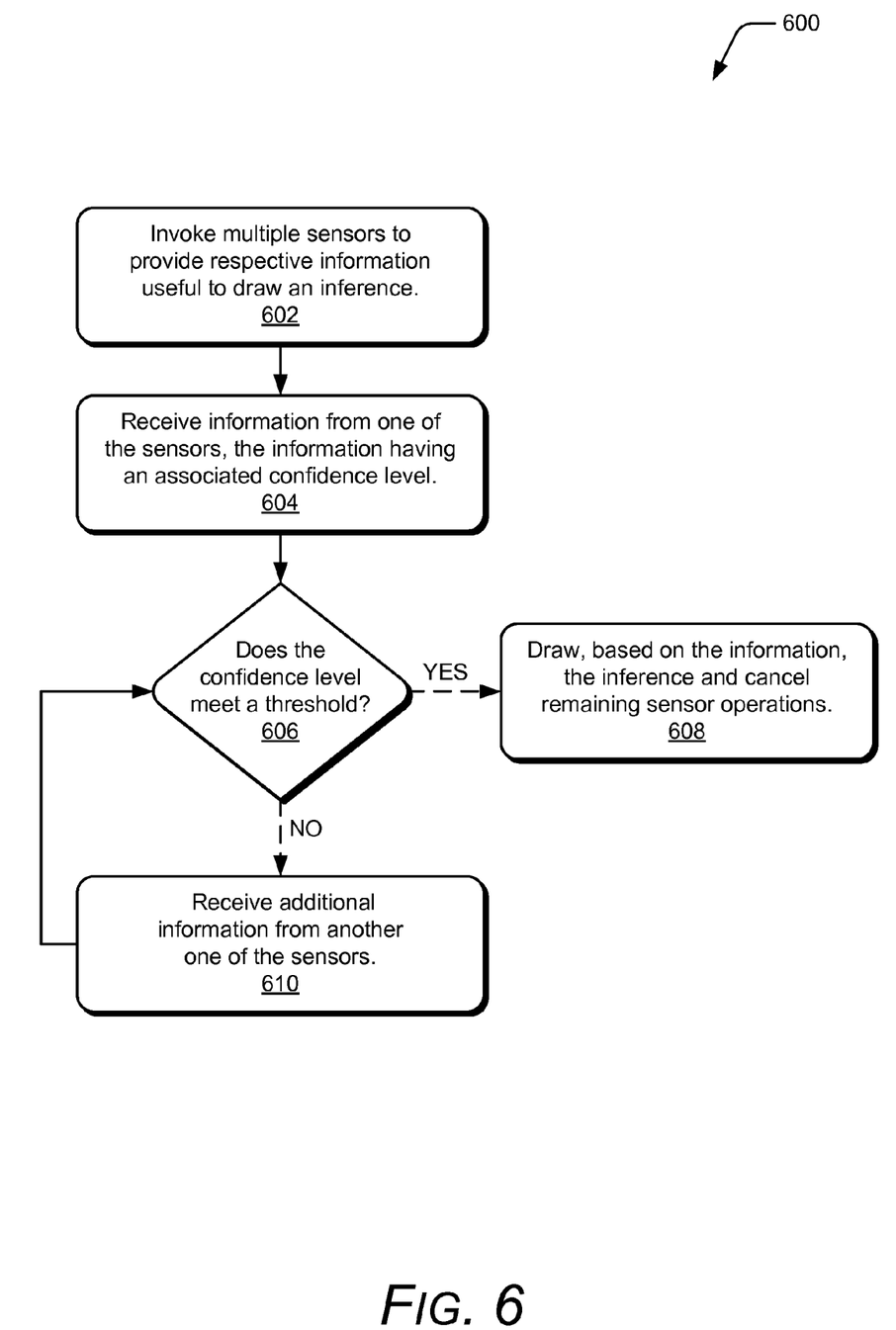
FIG. 6 illustrates an example method of invoking multiple sensors in parallel.

FIG. 6 illustrates example method 600 of invoking multiple sensors of a device in parallel.

At 602, multiple sensors are invoked to provide respective information for an inference. The multiple sensors can be selected from any of a device's sensors that are capable of providing the information for the inference. Once invoked, each of the sensors begins running in parallel to provide the respective information. In general, multiple sensors of the device can be run in parallel when sufficient resources of the device are available.

At 604, information is received from one of the sensors. The information has an associated confidence level, which may be determined, received from the sensor, or be previously associated with the sensor. In some cases, the associated confidence level associated with the first-received information is not the highest among the respective information provided by the multiple sensors. In such cases, however, the first sensor to provide information may consume fewer resources than the other sensors.

At 606, the confidence level associated with the information is compared with a confidence-level threshold. The confidence level can be pre-defined or determined based on various factors, such as available time, device resources, or previous inferences. Determining a threshold may enable the threshold to be customized or tailored based on a device's environment or available resources. Alternately or additionally, confidence-level thresholds may be different for each sensor capable of providing the information for the inference or prediction.

From operation 606, method 600 proceeds to operation 608 if the confidence level of the information meets or exceeds the confidence-level threshold. Alternately, method 600 proceeds to operation 610 if the confidence level of the information does not meet the confidence-level threshold. At 608, an inference is drawn based on the information received from one or more of the sensors. Further, operations of any sensors still running are cancelled. This is effective to save time and resources over the alternative of allowing the rest of the sensors to continue running until they are able to provide additional information.

By way of example, Bluetooth™ modules often provide information accurately and quickly when inferring whether a device is on a moving vehicle. Therefore, if the Bluetooth™ module provides information with a high level of confidence before other sensors running in parallel, then that information is trusted, and operations of other sensors can be cancelled. When a Bluetooth™ module is unable to find another Bluetooth™ device, however, another one of the sensors running in parallel can provide information with a high degree of confidence instead.

At 610, additional information is received from another one of the sensors. The additional information may also have an associated confidence level, which may be determined, received from the other sensor, or previously associated with the other sensor. The additional information can be combined with previously received information, which may lead to more accurate inferences or predictions. The confidence level associated with the additional information may also be combined with the confidence level of the previously received information for threshold-comparison purposes. From operation 610, method 600 returns to operation 606 to compare the confidence level of the combined information with the confidence-level threshold to determine if the inference should be drawn or if more information should be received from yet another sensor.

Figure 7:
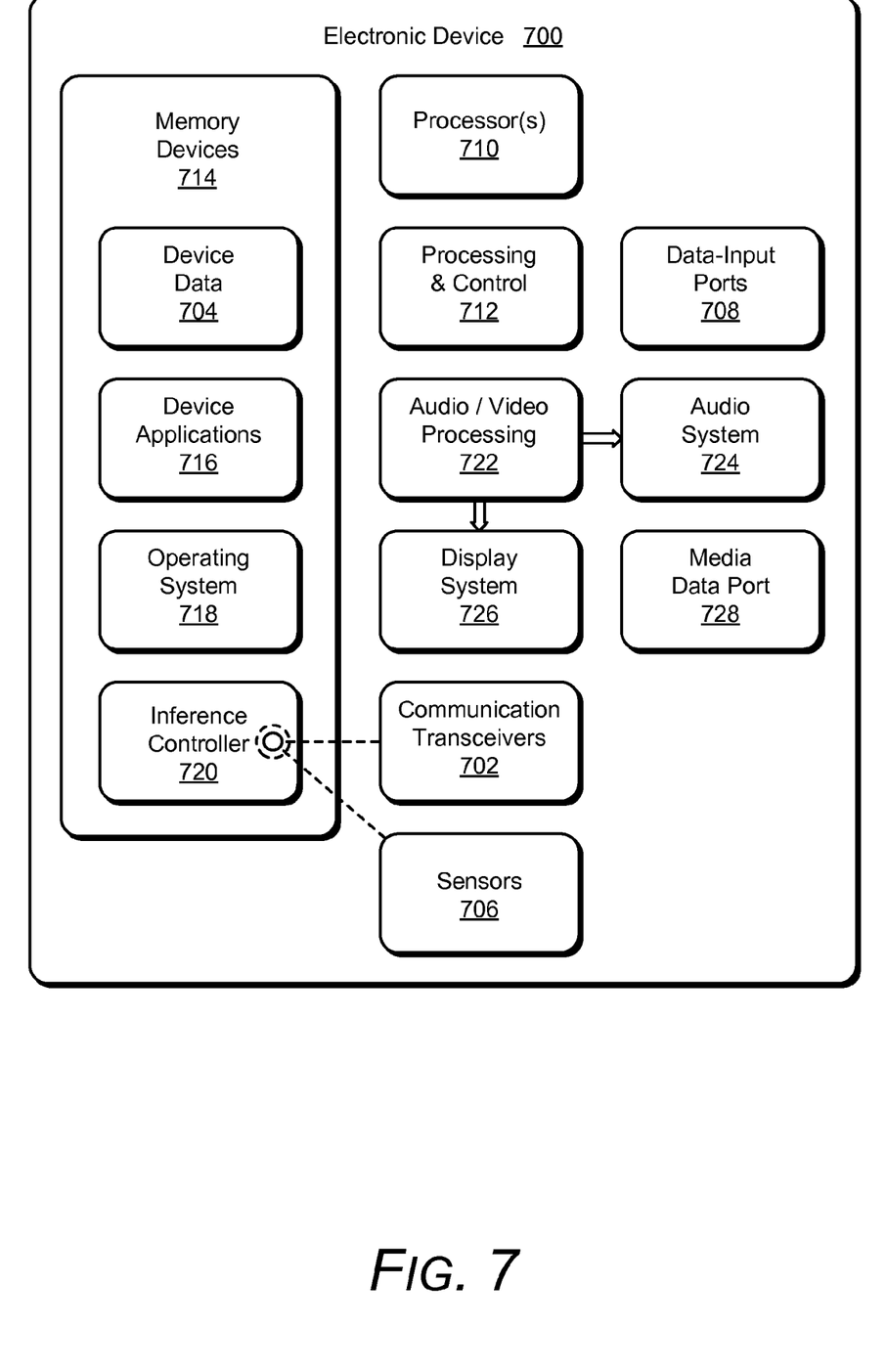
FIG. 7 illustrates various components of an electronic device that can implement techniques of drawing an inference using multiple sensors.

Example Electronic Device: FIG. 7 illustrates various components of an example electronic device 700 that can be implemented as a computing device as described with reference to any of the previous FIGS. 1 through 6. Electronic device 700 can be, or include, many different types of devices capable of using multiple sensors to draw an inference. For example, electronic device 700 may include a smartphone, tablet computer, personal navigation device, gaming device, Web-browsing platform, pager, media player, or any other type of electronic device, such as the computing device 102 described with reference to FIGS. 1 and 2.

Electronic device 700 includes communication transceivers 702 that enable wired or wireless communication of device data 704, such as received data and transmitted data. Example communication transceivers include WPAN radios compliant with various Institute of Electrical and Electronics Engineers ("IEEE") 802.15 standards, WLAN radios compliant with any of the various IEEE 802.11 standards, radios for cellular telephony, radios compliant with various IEEE 802.16 standards, and wired LAN Ethernet transceivers.

The electronic device 700 also includes sensors 706, such as an acoustic sensor, accelerometer, magnetic sensor, and the like, as described above. The sensors 706 can be implemented to facilitate various embodiments of drawing an inference using multiple sensors.

Electronic device 700 may also include one or more data-input ports 708 via which any type of data, media content, and inputs can be received, such as user-selectable inputs, messages, music, television content, recorded video content, and any other type of audio, video, or image data received from any content or data source. Data-input ports 708 may include universal serial bus ports, coaxial cable ports, and other serial or parallel connectors (including internal connectors) for flash memory, digital versatile disks, compact disks, and the like. These data-input ports may be used to couple the electronic device 700 to components, peripherals, or accessories such as keyboards, microphones, or cameras.

The exemplary electronic device 700 includes processor system 710 (e.g., any of application processors, microprocessors, digital-signal processors, controllers, and the like) or a processor and memory system (e.g., implemented in a system-on-chip), which process computer-executable instructions to control operation of the device 700. A processing system 710 may be implemented at least partially in hardware, which can include components of an integrated circuit or on-chip system, digital-signal processor, application-specific integrated circuit, field-programmable gate array, a complex programmable logic device, and other implementations in silicon and other hardware. The electronic device 700 can also be implemented with any one or combination of software, hardware, firmware, or fixed-logic circuitry that is implemented in connection with processing and control circuits, which are generally identified at 712. Although not shown, electronic device 700 can include a system bus, crossbar, interlink, or data-transfer system that couples the various components within the device 700. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 700 also includes one or more memory devices 714 that enable data storage, examples of which include random-access memory, non-volatile memory (e.g., read-only memory, flash memory, etc.), and a disk storage device. Memory devices 714 are implemented at least in part as physical devices that store information (e.g., digital or analog values) in storage media, which do not include propagating signals or waveforms. The storage media may be implemented as any suitable types of media such as electronic, magnetic, optic, mechanical, quantum, atomic, and so on. Memory devices 714 provide data-storage mechanisms to store the device data 704, other types of information or data, and various device applications 716 (e.g., software applications). For example, operating system 718 can be maintained as software instructions within memory devices 714 and executed by processors 710. In some aspects, inference controller 720 is embodied in memory devices 714 of electronic device 700 as executable instructions or code. Although represented as a software implementation, inference controller 720 may be implemented as any form of a control application, software application, signal processing and control module, firmware that is installed on the device, a hardware implementation of the controller, and so on.

Electronic device 700 also includes audio and video processing system 722 that processes audio data and passes through the audio and video data to audio system 724 and to display system 726. Audio system 724 and display system 726 may include any modules that process, display, or otherwise render audio, video, display, or image data, such as from inference controller 720. Display data and audio signals can be communicated to an audio component and to a display component via a radio-frequency link, S-video link, composite video link, component video link, digital video interface, analog audio connection, or other similar communication link, such as via media-data port 728. In some implementations, audio system 724 and display system 726 are external components to electronic device 700. Display system 726 can also be an integrated component of the example electronic device 700, such as part of an integrated display and touch interface.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   invoking, by a computing device, operations of a set of sensors from a plurality of chosen sensors to provide information for an inference;
   receiving, by the computing device and from a first one or more of the set of sensors, first information;
   determining, by the computing device and based at least in part on the first information, and with a degree of confidence or a margin of error, the inference associated with a usage context of the computing device;
   comparing, by the computing device, the degree of confidence or the margin of error with a respective confidence threshold or an respective error threshold;
   responsive to determining that the degree of confidence is greater than or equal to the respective confidence threshold or if the margin of error is less than or equal to the respective error threshold, cancelling, by the computing device, operations of a second one or more of the set of sensors from which the computing device has not yet received second information for the inference associated with the usage context of the computing device, wherein the second one or more of the set of sensors are different from the first one or more of the set of sensors; and
   configuring, by the computing device, based at least in part on the inference associated with the usage context of the computing device, at least a functionality of the computing device.

2. The method of claim 1, wherein the inference is selected from a group consisting of: a measurement, a determination, a Boolean value, a prediction, a geographical location, and an activity determination.

3. The method of claim 1, wherein the set of sensors comprises every sensor in the plurality of chosen sensors.

4. The method of claim 1, wherein the set of sensors is selected from the plurality of chosen sensors based at least in part on an element selected from a group consisting of: an expected margin of error for information to be provided by at least one sensor from the set of sensors, an expected degree of confidence for information to be provided by the at least one sensor, an expected amount of resources to be consumed by the at least one sensor, an expected overlap of information to be provided by the set of sensors, an expected amount of time used by a sensor to provide information, an expected price for using the at least one sensor, a privacy consideration for using the at least one sensor, an importance of the inference to be drawn, and an acceptability threshold for information for the inference.

5. The method of claim 1, further comprising:
   responsive to determining that the degree of confidence is less than the respective confidence threshold or that the margin of error is greater than the respective error threshold:
      waiting to receive the second information from the second one or more of the set of sensors; and
      repeating the determining of the inference and the comparing with the second information received from the second one or more of the set of sensors until the degree of confidence is greater than or equal to the respective confidence threshold, the margin of error is less than or equal to the respective error threshold, or until the first information and the second information have been received from all of the set of sensors.

6. An apparatus comprising:
   a plurality of chosen sensors,
   at least one processor configured to:
      invoke operations of a set of sensors from the plurality of chosen sensors to provide information for an inference;
      receive, from a first one or more of the set of sensors, first information;

determine, based at least in part on the first information and with a degree of confidence or a margin of error, the inference associated with a usage context of a computing device;

compare the degree of confidence or the margin of error with a respective confidence threshold or error threshold; and responsive to determining that the degree of confidence is greater than or equal to the respective confidence threshold or if the margin of error is less than or equal to the respective error threshold, cancel operations of a second one or more of the set of sensors from which the computing device has not yet received second information for the inference associated with the usage context of the computing device, wherein the second one or more of the set of sensors are different from the first one or more of the set of sensors; and configure, based at least in part on the inference associated with the usage context of the computing device, at least a functionality of the computing device.

7. The apparatus of claim 6, further comprising:
wherein the at least one processor is configured to select the set of sensors from the plurality of chosen sensors and to select a sensor remote from the apparatus.

8. The apparatus of claim 6, wherein the inference is selected from a group consisting of: a measurement, a determination, a Boolean value, a predication, a geographical location, and an activity determination.

9. The apparatus of claim 6, wherein the set of sensors comprises every sensor in the plurality of chosen sensors.

10. The apparatus of claim 6, wherein the set of sensors comprises at least one sensor of a group consisting of: an accelerometer, an acoustic sensor, an infrared sensor, a magnetometer, a global positioning system, a short-range radio, and a wireless local-area-network radio.

11. A non-transitory computer readable storage medium comprising instructions that, when executed on at least one processor, cause the at least one processor to:

invoke a set of sensors from a plurality of chosen sensors to provide information for an inference;

receive, from a first one or more of the set of sensors, first information;

determine, based at least in part on the received first information and with a degree of confidence or a margin of error, the inference associated with a usage context of a computing device;

compare, by the computing device, the degree of confidence or the margin of error with a respective confidence threshold or error threshold;

responsive to determining that the degree of confidence is greater than or equal to the respective confidence threshold or if the margin of error is less than or equal to the respective error threshold, cancel operations of a second one or more of the set of sensors from which the computing device has not yet received second information for the inference associated with the usage context of the computing device, wherein the second one or more of the set of sensors are different from the first one or more of the set of sensors; and configure, based at least in part on the inference associated with the usage context of the computing device, at least a functionality of the computing device.

12. The non-transitory computer readable storage medium of claim 11, wherein the inference is selected from a group consisting of: a measurement, a determination, a Boolean value, a prediction, a geographical location, and an activity determination.

13. The non-transitory computer readable storage medium of claim 11, wherein the set of sensors comprises every sensor in the plurality of chosen sensors.

14. The non-transitory computer readable storage medium of claim 11, wherein the set of sensors is chosen from the plurality of chosen sensors based at least in part on an element selected from the group consisting of: an expected margin of error for information to be provided by a sensor, an expected degree of confidence for information to be provided by a sensor, an expected amount of resources to be consumed by a sensor, an expected overlap of information to be provided by a set of sensors, an expected amount of time used by a sensor to provide information, an expected price for using a sensor, a privacy consideration for using a sensor, an importance of the inference to be drawn, and an acceptability threshold for information for the inference.

15. The non-transitory computer readable storage medium of claim 11, wherein the instructions, when executed on the at least one processor, further cause the at least one processor to:

responsive to the degree of confidence of the inference being less than the respective confidence threshold or if the margin of error is greater than the respective error threshold, wait to receive the second information from at least one of the second one or more of the set of sensors, and repeat the drawing and comparing steps with the second information received from the second one or more of the set of sensors until the degree of confidence is greater than or equal to the respective confidence threshold, the margin of error is less than or equal to the respective error threshold, or until the first information and the second information have been received from all of the set of sensors.

* * * * *